(12) United States Patent
Xu et al.

(10) Patent No.: US 12,051,168 B2
(45) Date of Patent: Jul. 30, 2024

(54) AVATAR GENERATION BASED ON DRIVING VIEWS

(71) Applicants: Lemon Inc., Grand Cayman (KY); Beijing Zitiao Network Technology Co., Ltd., Beijing (CN)

(72) Inventors: Hongyi Xu, Los Angeles, CA (US); Tao Hu, Beijing (CN); Linjie Luo, Los Angeles, CA (US)

(73) Assignees: LEMON INC., Grand Cayman (KY); BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 133 days.

(21) Appl. No.: 17/932,645

(22) Filed: Sep. 15, 2022

(65) Prior Publication Data

US 2024/0096041 A1 Mar. 21, 2024

(51) Int. Cl.
G06T 19/20 (2011.01)
G06T 7/73 (2017.01)
G06T 15/04 (2011.01)
G06T 17/20 (2006.01)

(52) U.S. Cl.
CPC ............ *G06T 19/20* (2013.01); *G06T 7/75* (2017.01); *G06T 15/04* (2013.01); *G06T 17/20* (2013.01); *G06T 2207/20084* (2013.01); *G06T 2210/16* (2013.01); *G06T 2219/2004* (2013.01)

(58) Field of Classification Search
None
See application file for complete search history.

(56) References Cited

U.S. PATENT DOCUMENTS 11,386,633 B2 * 7/2022 Liu ..................... G06V 10/764
2022/0237879 A1 * 7/2022 Wu ........................ G06T 15/04

OTHER PUBLICATIONS

Hu, T. et al., "HVTR: Hybrid Volumetric-Textural Rendering for Human Avatars," arXiv:2112.10203v1, Dec. 19, 2021, 16 pages.
Raj, A. et al., "ANR: Articulated Neural Rendering for Virtual Avatars," Computer Vision and Pattern Recognition (CVPR), 2021, 10 pages.

(Continued)

*Primary Examiner* — Kee M Tung
*Assistant Examiner* — Jed-Justin Imperial
(74) *Attorney, Agent, or Firm* — Alleman Hall & Tuttle LLP (57) ABSTRACT

Systems and methods are provided that include a processor executing an avatar generation program to obtain driving view(s), calculate a skeletal pose of the user, and generate a coarse human mesh based on a template mesh and the skeletal pose of the user. The program further constructs a texture map based on the driving view(s) and the coarse human mesh, extracts a plurality of image features from the texture map, the image features being aligned to a UV map, and constructs a UV positional map based on the coarse human mesh. The program further extracts a plurality of pose features from the UV positional map, the pose features being aligned to the UV map, generates a plurality of pose-image features based on the UV map-aligned image features and UV map-aligned pose features, and renders an avatar based on the plurality of pose-image features.

20 Claims, 8 Drawing Sheets

| Rendering method | LPIPS | FID | SSIM | PSNR |
|---|---|---|---|---|
| DNR | 0.119 | 99.89 | 0.797 | 23.78 |
| SMPLpix | 0.116 | 95.61 | 0.8 | 23.87 |
| EgoRenderer | 0.107 | 85.97 | 0.813 | 24.74 |
| Ours-P | 0.115 | 93.79 | 0.803 | 23.34 |
| Ours-P-UV-1 | 0.101 | 80.29 | 0.818 | 24.54 |
| Ours-P-UV-2 | 0.093 | 73.7 | 0.825 | 24.98 |

(56) References Cited

OTHER PUBLICATIONS

Patel, C. et al., "TailorNet: Predicting Clothing in 3D as a Function of Human Pose, Shape and Garment Style," Computer Vision and Pattern Recognition (CVPR), 2020, 11 pages.

Hu, T. et al., "EgoRenderer: Rendering Human Avatars from Egocentric Camera Images," International Conference on Computer Vision (ICCV), Oct. 2021, 11 pages.

Mildenhall, B. et al., "NeRF: Representing Scenes as Neural Radiance Fields for View Synthesis," European Computer Vision Association (ECVA), 2020, 17 pages.

Dai, Y., et al., "Attentional Feature Fusion," Winter Conference on Applications of Computer Vision (WACV), 2021, 10 pages.

Kajiya J.T., et al., "Ray Tracing Volume Densities," Computer Graphics, vol. 18, No. 3, Jul. 1984, 10 pages.

Sitzmann, V. et al., "DeepVoxels: Learning Persistent 3D Feature Embeddings," Computer Vision and Pattern Recognition (CVPR), 2019, 10 pages.

Sitzmann, V. et al., "Scene Representation Networks: Continuous 3D-Structure-Aware Neural Scene Representations," 33rd Conference on Neural Information Processing Systems (NeurIPS 2019), 2019, 12 pages.

Michalkiewicz, M. et al., "Deep Level Sets: Implicit Surface Representations for 3D Shape Inference," arXiv:1901.06802v1, Jan. 21, 2019, 10 pages.

Park, J. J. et al., "DeepSDF: Learning Continuous Signed Distance Functions for Shape Representation," Computer Vision and Pattern Recognition (CVPR), 2019, 10 pages.

Pumarola, A. et al., "Unsupervised Person Image Synthesis in Arbitrary Poses," Computer Vision and Pattern Recognition (CVPR), 2018, 9 pages.

Kratzwald, B. et al., "Towards an Understanding of OurWorld by GANing Videos in the Wild," ArXiv:1711.11453v1, Nov. 30, 2017, 11 pages.

Ma, L. et al., "Disentangled Person Image Generation," Computer Vision and Pattern Recognition (CVPR), 2018, 10 pages.

Su, S-Y. et al., "A-NeRF: Articulated Neural Radiance Fields for Learning Human Shape, Appearance, and Pose," arXiv:2102.06199v3, Oct. 29, 2021, 24 pages.

Zhou, P. et al., "CIPS-3D: A 3D-Aware Generator of GANs Based on Conditionally-Independent Pixel Synthesis," arXiv:2110.09788v1, Oct. 19, 2021, 10 pages.

Zhang, Y. et al., "VirtualCube: An Immersive 3D Video Communication System," arXiv:2112.06730v2, Dec. 29, 2021, 11 pages.

Zhang, R. et al., "The Unreasonable Effectiveness of Deep Features as a Perceptual Metric," arXiv:1801.03924v2, Apr. 10, 2018, 14 pages.

Heusel, M., et al., "GANs Trained by a Two Time-Scale Update Rule Converge to a Local Nash Equilibrium," arXiv:1706.08500v6, Jan. 12, 2018, 38 pages.

Xu, F. et al., "Video-based Characters—Creating New Human Performances from a Multi-view Video Database," 2011, 10 pages.

\* cited by examiner

| Rendering method | LPIPS | FID | SSIM | PSNR |
|---|---|---|---|---|
| DNR | 0.119 | 99.89 | 0.797 | 23.78 |
| SMPLpix | 0.116 | 95.61 | 0.8 | 23.87 |
| EgoRenderer | 0.107 | 85.97 | 0.813 | 24.74 |
| Ours-P | 0.115 | 93.79 | 0.803 | 23.34 |
| Ours-P-UV-1 | 0.101 | 80.29 | 0.818 | 24.54 |
| Ours-P-UV-2 | 0.093 | 73.7 | 0.825 | 24.98 |

FIG. 5

AVATAR RENDERED WITH EGORENDERER

AVATAR RENDERED BASED ON POSE FEATURES, NO IMAGE FEATURES (OURS-P)

AVATAR RENDERED BASED ON POSE-IMAGE FEATURES, ONE DRIVING VIEW (OURS-P-UV-1)

GROUND TRUTH IMAGE

AVATAR RENDERED WITH EGORENDERER

AVATAR RENDERED BASED ON POSE FEATURES, NO IMAGE FEATURES (OURS-P)

AVATAR RENDERED BASED ON POSE-IMAGE FEATURES, ONE DRIVING VIEW (OURS-P-UV-1)

GROUND TRUTH IMAGE

AVATAR GENERATION BASED ON DRIVING VIEWS

BACKGROUND

In the field of computer vision and graphics, capturing and rendering realistic human appearances under varying poses and viewpoints presents a significant technical challenge. Recent neural rendering methods have made progress in generating realistic images of humans, offering certain performance advantages over traditional graphics pipelines. Though these neural rendering methods are capable of learning human avatars from videos of human subjects, the quality of the rendered avatars at inference time is insufficient for some applications. One reason for this is that, at inference time, these neural rendering methods take as input driving signals with low-dimensional parameterization, which cannot encode a sufficiently complete appearance of a clothed human for generation of realistic, fine details in the rendered avatar. As two particular examples, the quality in the rendering of pose-dependent surface details such as wrinkles on the clothes of the rendered avatars may suffer, and areas of occlusion in the original driving views may not be generated in a realistic manner in the rendered avatars.

SUMMARY

In view of the above, a computing system is provided comprising a processor and memory of a computing device, the processor being configured to execute an avatar generation program using portions of memory. Upon execution, the processor is configured to obtain one or more driving views, calculate a skeletal pose of a user, and generate a coarse human mesh representing the user based on a template mesh and the skeletal pose of the user. The processor is further configured to construct a UV positional map based on the coarse human mesh, construct a texture map based on the one or more driving views and the coarse human mesh, and extract a plurality of image features from the texture map. The image features are aligned to a UV positional map. The processor may further be configured to extract a plurality of pose features from the UV positional map, the pose features also being aligned to the UV positional map, generate a plurality of pose-image features based on the UV map-aligned image features and UV map-aligned pose features, and render an avatar based on the plurality of pose-image features.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
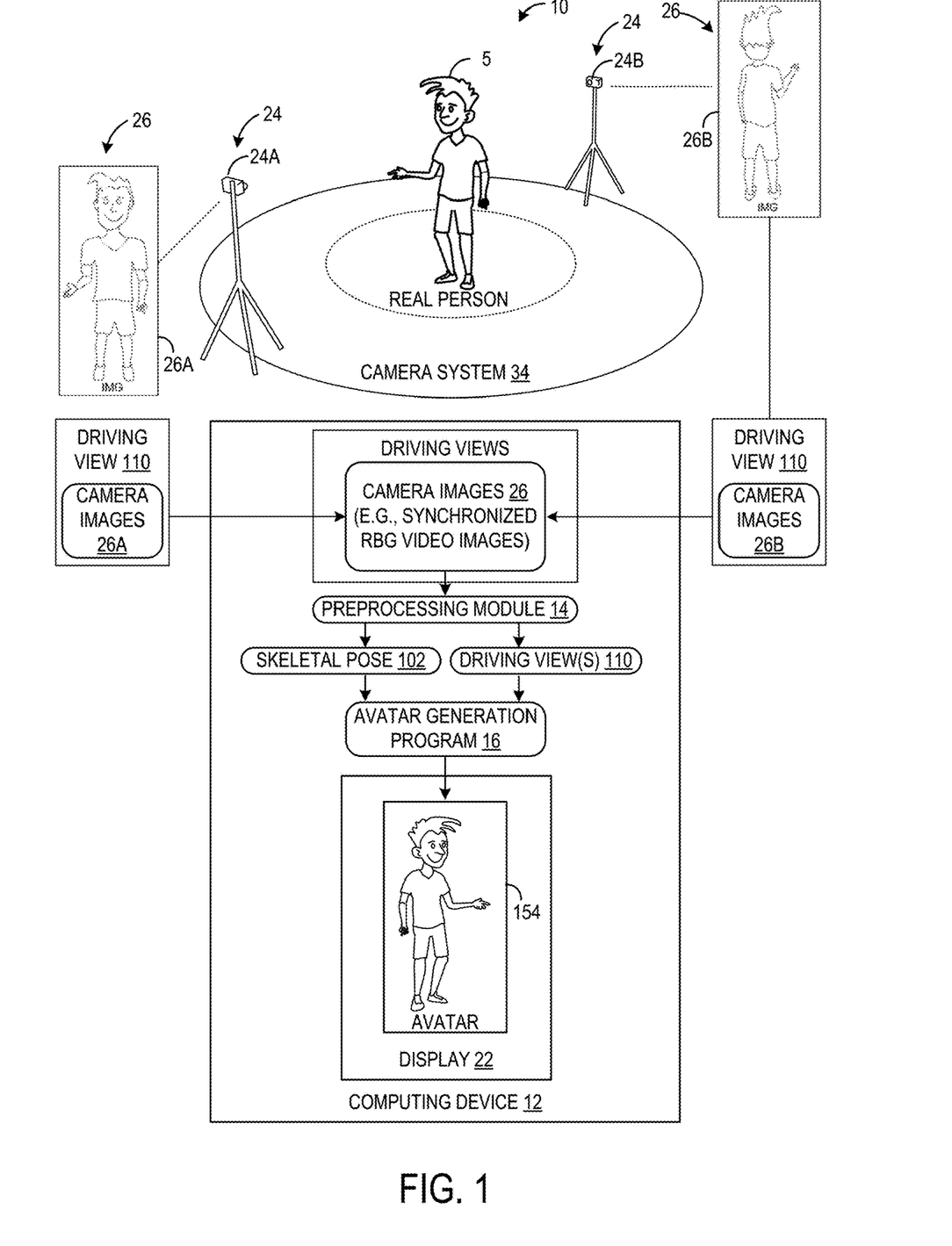
FIG. 1 illustrates a schematic view of a computing system according to an example of the present disclosure.

Referring initially to FIG. 1, in view of the issues discussed above a computing system 10 is provided. Computing system 10 includes a computing device 12 that is configured to obtain one or more camera images 26 of a user 5 from a camera system 34 and programmatically generate and display an avatar 154 of the user 5.

Camera system 34 may include one or a plurality of cameras 24. For example, in the depicted embodiment, two cameras are illustrated, including a first camera 24A positioned in a first orientation (front facing in this example) so as to capture a camera image 26A of the user 5 from a first perspective (a front perspective in this example). The camera system 34 further includes a second camera 24B positioned in a second orientation different from the first orientation (rear-facing in this example) so as to concurrently capture a second camera image 26B of the person 5 from a second perspective different from the first perspective (from the rear in this example). Each camera captures a respective driving view 110, which is a set of camera images 26 captured from a particular camera and perspective. Although depicted on tripods, the cameras 24 may be mounted on other mounting hardware. It is also possible that the cameras be handheld in some examples. The one or more driving views 110 may include one or a plurality of pixel images with color channels and no depth channels, such as RGB images, CMYK images, etc.

Although two cameras are illustrated, the camera system 34 may be configured with just one camera in some embodiments. In other embodiments, the camera system may be configured with more than two cameras. For example, a plurality of cameras may be positioned in a 360-degree circle surrounding the subject user. Typically, the cameras provide images from predetermined perspectives. During animation of the avatar 154 produced by the computing system 10, the avatar may be driven by a view of a user from an arbitrary perspective. In the depicted embodiment, the camera system 34 is external to the computing device, and configured to transmit the camera images 26 by wired or wireless connection to the computing device, or to store the camera images 26 on media readable by the computing device 12. Alternatively, as shown in FIG. 2, a camera system 34A may be provided that is internal to the computing device 12, such as when the computing device 12 is configured as a laptop, smartphone, or tablet computer, for example.

Continuing with FIG. 1, a preprocessing module 14 may be executed by the computing device 12 to process captured camera images 26 to obtain one or more driving views 110 and to calculate a skeletal pose 102 of the user based on the captured camera images 26. An avatar generation program 16 executed by the computing device 12 receives the skeletal pose 102 and the one or more driving views 110, and renders an avatar 154 based on this input. The rendered avatar 154 may be displayed on a display 22 of the computing device 12.

Figure 2:
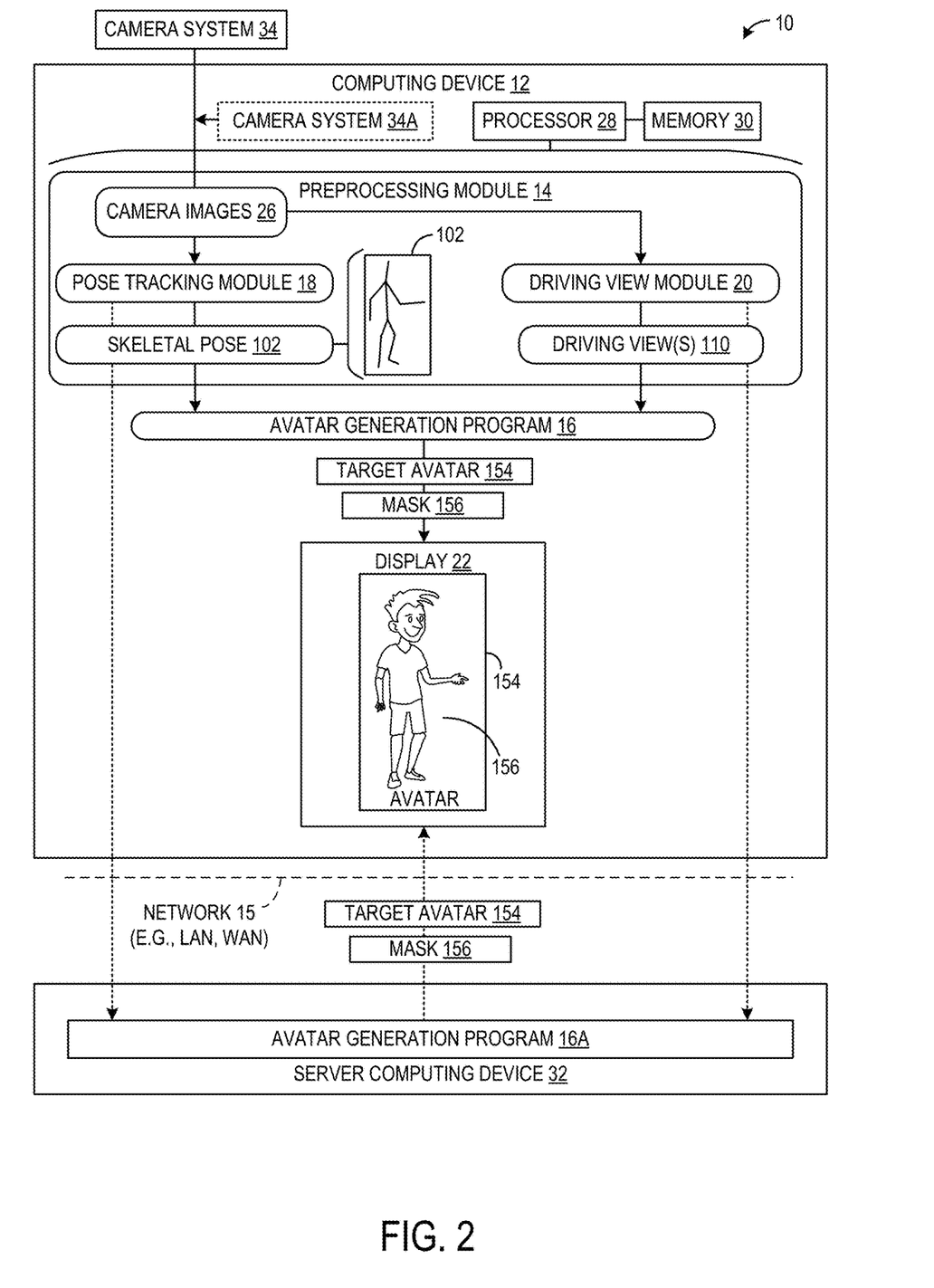
FIG. 2 illustrates another schematic view of the computing system of FIG. 1.

Turning now to FIG. 2, the computing device 12 of computing system 10 includes a processor 28, a memory 30, camera system 34, and display 22. The processor is configured to execute instructions stored in a non-volatile storage device, using portions of memory 30, to implement the functions of the preprocessing module 14, avatar generation program 16, and other software described herein.

The processor 28 executes the preprocessing module 14, which includes a pose tracking module 18 that is configured to receive the one or more camera images 26 captured by the camera system 34, and calculate a skeletal pose 102 based on the camera images 26. The camera images 26 provide reference driving views 110 of a user from certain perspectives. Following avatar 154 generation, the avatar 154 may be depicted at arbitrary angles based on features learned from the reference driving views 110, as described below. A driving view module 20 is configured to obtain one or more driving views 110 by converting the camera images 26, captured by the camera system 34, into the one or more driving views 110. This conversion may involve downscaling the camera images to a standard resolution and color depth, cropping the image to remove areas in which the user is not depicted, and organizing the images into sets of images that were concurrently (i.e., substantially simultaneously) captured of the user from different perspectives, when more than one driving view is used. A driving view includes a set of images captured by the same camera at a known or calculable perspective. The skeletal pose 102 and the one or more driving views 110 are inputted into an avatar generation program 16, which subsequently generates and renders an avatar 154 and a mask 156 corresponding to the avatar 154 to be displayed on the display 22.

As shown in dotted lines in FIG. 2, the computing system 10 may further include a server computing device 32 configured to execute a cloud instance of the avatar generation program 16A. In such a configuration, some or all of the functions of the avatar generation program 16 may instead be fulfilled by the cloud instance of the avatar generation program 16A. Thus, for example, the skeletal pose 102 and the one or more driving views 110 may be sent by the pose tracking module 18 and the driving view module 20, respectively, via a computer network 15 to the avatar generation program 16A executed on the server computing device 32, which subsequently generates and sends a target avatar 154 and a mask 156 corresponding to the avatar 154 to the computing device 12 over the computer network 15. The computing device 12 then renders and displays the avatar 154 and the mask 156 received from the server computing device 32 on the display 22.

Figure 3A:
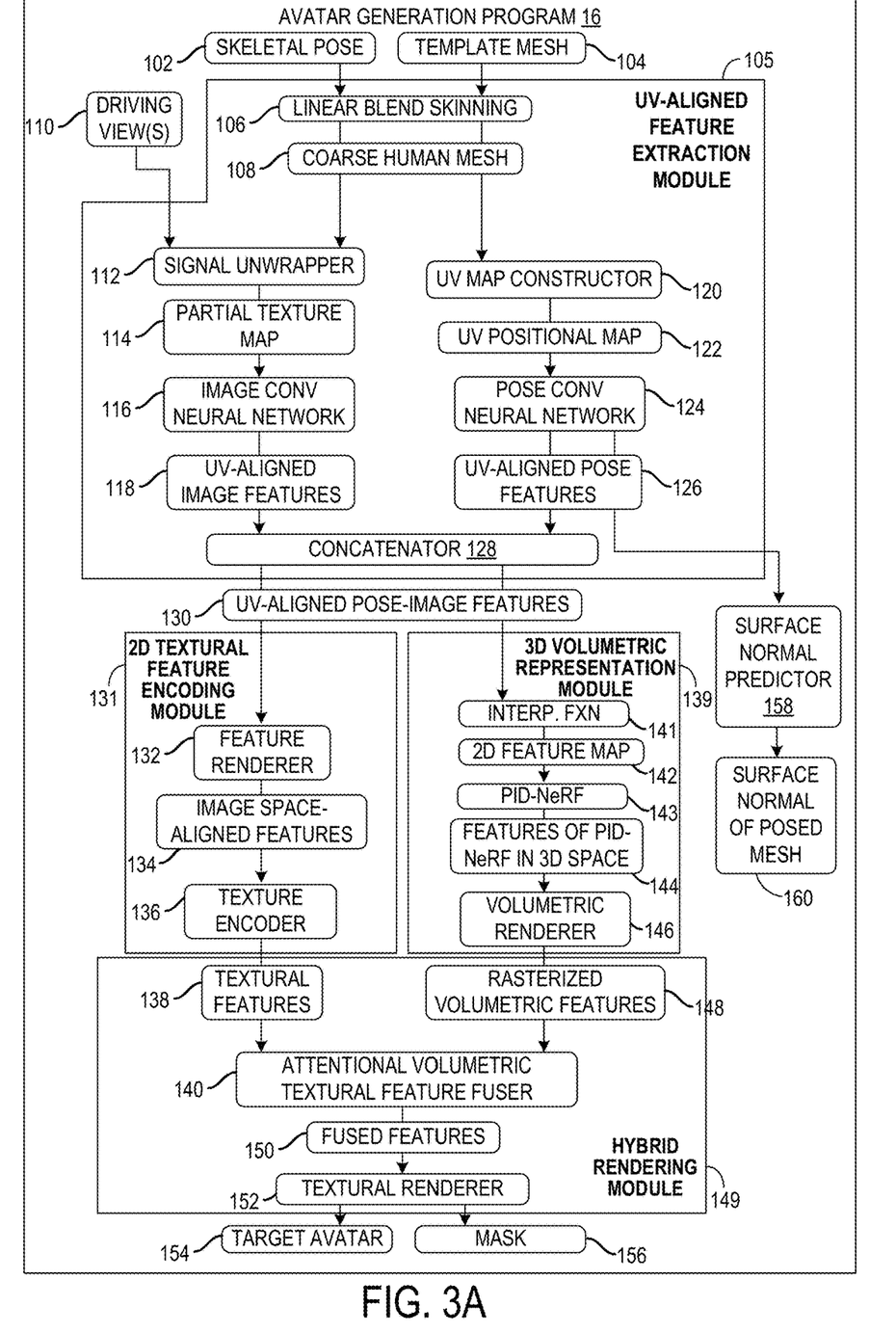
FIGS. 3A and 3B illustrate detailed schematic views of the avatar generation program of the computing system of FIGS. 1 and 2.
Figure 3B:
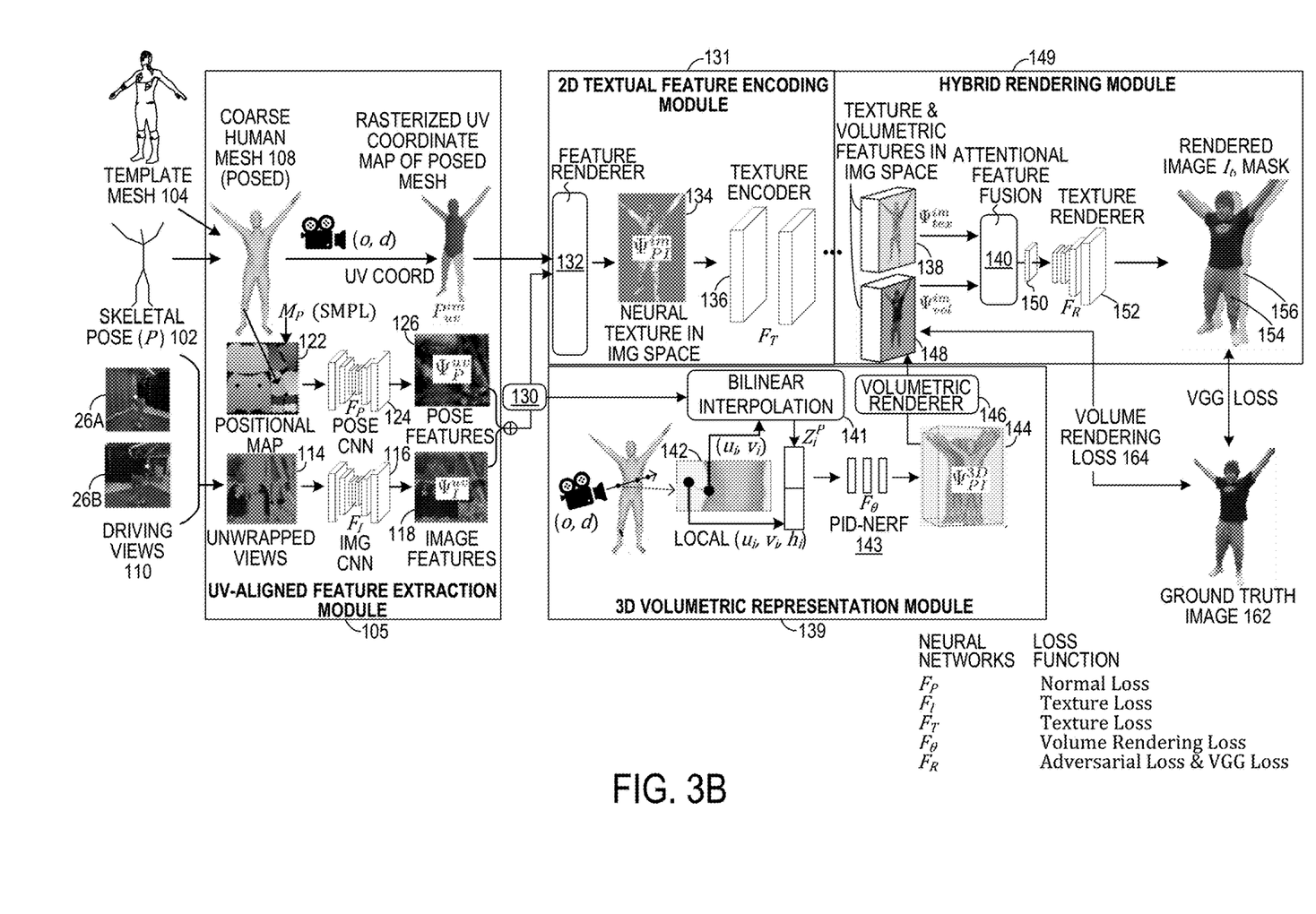

FIG. 3A shows a detailed schematic view of the avatar generation program 16, in which the skeletal pose 102, the template mesh 104, and at least the driving view 110 are inputted and processed to render and display a target avatar 154. FIG. 3B shows a graphical depiction of the pipeline of the avatar generation program shown in FIG. 3A. Continuing with FIG. 3A, the avatar generation program 16 includes a UV-aligned feature extraction module 105 configured to extract both pose features and image features and represent them in a UV map-aligned manner, a 2D textural feature encoding module 131 configured to perform neural rendering of textural features based on both the pose features and image features identified by the UV-aligned feature extraction module 105 in image space, a 3D volumetric representation module 139 configured to render a three dimensional volume of the posed mesh, and a hybrid rendering module 149 configured to render an image of a target avatar and a mask based on rasterized volumetric and textural features, as explained below.

UV-Aligned Feature Extraction

The UV-aligned feature extraction module 105 is configured to receive the one or more driving views 110, the skeletal pose 102, and a template mesh 104 as input, and output UV map-aligned pose-image features 130. FIG. 3B illustrates an example of the skeletal pose 102 (P) with upstretched arms, an example of the template mesh in canonical pose with arms downwardly outstretched, and two example driving views 110 consisting of camera images 26 from the side and back of a user, with arms upstretched. Continuing with FIG. 3A, the UV-aligned feature extraction module 105 includes Linear Blend Skinning (LBS) function 106, a signal unwrapper 112, an image convolutional neural network 116 ($F_I$), a UV map constructor 120, a pose convolutional neural network 124 ($F_P$), and a concatenator 128.

The example template mesh 104 shown in FIG. 3B is a skinned multi-person linear model (SMPL) in a canonical pose. The LBS function 106 is configured to deform the template mesh by blending the output of multiple transforms (e.g., rotation, translation, and scaling) to the template mesh 104, to thereby deform the template mesh 104 to produce a coarse human mesh 108. FIG. 3B illustrates the coarse human mesh posed with upstretched arms, and labels the coarse human MP. Continuing with FIG. 3A, to produce the coarse human mesh 108, responsive to receiving inputs of the skeletal pose 102 and template mesh 104 in the canonical pose, the LBS function 106 generates and outputs the coarse human mesh 108 representing the user, which is posed similarly to skeletal pose 102, based on the template mesh 104 and the skeletal pose 102 of the user. This is illustrated in FIG. 3B, which shows both the skeletal pose 102 (P) and the coarse human mesh posed with upstretched arms. The LBS function 106 reconstructs the coarse human mesh 108 in a forward skinning step.

Continuing with FIG. 3A, the signal unwrapper 112 is configured to process the camera images 26 in the driving views 110 by identifying the portion of the camera image 26 that is of the user, labeling pixels in the extracted image as belonging to specific portions of the user's body, and then mapping the color of those pixels to a standardized unwrapped 360-degree view of the user's body, in UV space. Thus, responsive to receiving input of at least the driving view 110 and the coarse human mesh 108, the signal unwrapper 112 transforms the one or more driving views 110 into a partial texture map 114. The signal unwrapper 112 outputs the partial texture map 114, which includes the plurality of unwrapped texture maps in UV space. Since multiple images in the driving view may contain pixel values for the same portion of the user's body, the signal unwrapper 112 unions and averages all unwrapped texture maps to construct a multi-view partial texture map 114 based on the one or more driving views 110 and the coarse human mesh 108, so that UV correspondences are leveraged between image pixels of a plurality of driving views 110 and the fitted coarse human mesh 108. FIG. 3B illustrates an example image of the partial texture map 114 containing the unwrapped views, with pixel values from the inputted driving views painted at appropriate locations in the UV-aligned partial texture map 114 containing the unwrapped views.

Image convolutional neural network 116 has been trained to recognize image features (or, more specifically, texture features) that are contained in the UV-aligned partial texture map 114. For example, Gray-Level Co-occurrence Matrix (GLCM) and Local Binary Pattern (LBP) are two texture features that may be extracted by the image convolutional neural network 116. Responsive to receiving input of the partial texture map 114, the image convolutional neural network 116 extracts and outputs a plurality of UV map-aligned image features 118 ($\Psi_I^{uv}$) from the partial texture map 114. For ease of illustration, FIG. 3B illustrates the UV map-aligned image features 118 as a pixel image, but in a typical implementation these image features are parameterized values representing texture features rather than pixel colors. An L1 loss is used to supervise the first three channels of the UV map-aligned image features 118 as close to the partial texture map 114 unwrapped from all reference views. The image convolutional neural network 116 may be trained by calculating a texture loss between the first three channels of the image feature and the reference texture maps unwrapped from all reference views for a given pose. Processing from the signal unwrapper 112 to the UV map-aligned features 118 forms a texture processing pipeline.

Continuing with FIG. 3A, in a parallel processing pipeline to the texture processing pipeline described above, a pose processing pipeline extends from the UV map constructor 120 to the UV map-aligned pose features 126. The UV map constructor 120 is configured to process the three-dimensional mesh 108 and generate a two-dimensional UV positional map 122. Thus, responsive to receiving input of the coarse human mesh 108, the UV map constructor 120 reconstructs and outputs the UV positional map 122. As illustrated schematically by an arrow in FIG. 3B, the UV map constructor 120 projects each surface point on the coarse human mesh 108 from 3D position to its UV manifold, where each pixel describes the relative location of the point on the body surface manifold. The UV positional map 122 may be sized U×U×3, in one example.

Continuing with FIG. 3A, responsive to receiving input of the UV positional map 122, a pose convolutional neural network 124 regresses the UV positional map 122 into high-dimensional UV map-aligned pose features 126 (IT) to thereby extract the plurality of UV map-aligned pose features 126 from the UV positional map 122. Accordingly, pose-dependent features may be learned from 2D images instead of 3D point clouds, as with prior approaches, thereby simplifying computation. It will be appreciated that the UV map-aligned pose features 126 are shown for ease of illustration as a 2D image in FIG. 3B, but in practice they are UV-aligned multi-dimensional vectors representing the pose features present for each x-y coordinate in the UV positional map.

Continuing with FIG. 3A, the concatenator 128, which may be configured as a neural texture model, receives as input the UV map-aligned image features 118 and the UV map-aligned pose features 126, concatenates the UV map-aligned image features 118 and the UV map-aligned pose features 126, and generates and outputs a plurality of UV map-aligned pose-image features 130, or concatenated pose-image feature vectors, based on the UV map-aligned image features 118 and the UV map-aligned pose features 126. These features are pose-dependent and preserve spatial structures (semantics, poses, shapes) of the dynamic human figure, which are leveraged to enhance neural rendering quality in subsequent steps. As a specific example of how the rendering quality is improved, the UV map-aligned pose features 126 may capture information sufficient to render the general shape of clothing (e.g., shirt or pants) worn by a user, and the UV map-aligned image features 118 may capture texture information regarding how and where wrinkles form in each type of clothing of the user. By including both sets of information in the concatenated feature vector containing the UV map-aligned pose-image features 130 used during rendering, surface details such as wrinkles in the clothing can be more realistically rendered. This is because the UV map-aligned pose-image features 130 may include texture information indicating where wrinkles form in clothing of the user, which is attended to during the neural texture rendering by the feature renderer 132.

To guide geometric feature learning, the pose convolutional neural network 124 may be trained by calculating a normal loss between the surface normal 160 of the posed mesh in UV space and the surface normal of the coarse human mesh. The surface normal predictor 158 may predict the surface normal 160 of the posed mesh in UV space from the UV map-aligned pose features 126 using a shallow convolutional neural network $F_N$. The target surface normal of the coarse human mesh 108 is obtained and projected into UV space, and the surface normal 160 is supervised with an L1 loss. Accordingly, a surface normal estimation network may guide geometric learning.

2D Textural Feature Encoding

The UV map-aligned pose-image features 130 are then transformed from UV space to image space by a feature renderer 132, which outputs image space-aligned features 134 ($\Psi_{PI}^{im}$). The image space-aligned features 134 are further regressed by a texture encoder 136 implementing a two-dimensional convolutional neural network ($F_T$) to output high-dimensional textural features 138 ($\Psi_{tex}^{im}$) in image space.

3D Volumetric Representation

Turning to the 3D volumetric representation module 139, to render the observation space for arbitrary position o and view direction d as shown in FIG. 3B, the UV map-aligned pose-image features 130 are queried, using a barycentric or bilinear interpolation function 141, for all sampled points along camera rays and integrated into a 2D feature map 142. Continuing with reference to both FIGS. 3A and 3B, a pose- and image-conditioned neural radiance field (PID-NeRF) neural network ($F_\theta$) 143 regresses the 2D feature map 142 to generate three-dimensional volumetric features 144 of PID-NeRF in 3D space. These three-dimensional volumetric features encoded as the volumetric features 144 of PID-NeRF in 3D space are rasterized into rasterized multi-channel volumetric features 148 ($\Psi_{vol}^{im}$) in image space, and each pixel is predicted by accumulating features of consecutive samples along a corresponding ray by a volumetric renderer 146 implementing a neural network. The first three channels of the rasterized multi-channel volumetric features 148 may be RGB, which may be supervised by downsampled ground truth images 162, using volume rendering loss 164. Alternatively, other color encoding may be used, such as CMYK, etc.

Hybrid Rendering

With continued reference to FIGS. 3A and 3B, within the hybrid rendering module 149 the 2D textural features 138 and the rasterized multi-channel volumetric features 148 are fused together by an attentional volumetric textural feature fuser 140, which may include a convolutional neural network configured to downsample the textural features 138 to the same size as the rasterized multi-channel volumetric features 148, and/or extend the channels of the rasterized multi-channel volumetric features 148 to the same dimensionality as the 2D textural features 138. The fused features 150 outputted by the attentional volumetric textural feature fuser 140 are received as input by the textural renderer 152 ($F_R$), which converts the fused features 150 into the target avatar 154 and a mask 156 to thereby render the target avatar 154 and the mask 156. The target avatar 154 and the mask 156 are subsequently synthesized and displayed on the display 22 of FIG. 2. The textural renderer 152 may be based on a generative adversarial network (GAN). Due to the additional information provided by the UV map-aligned pose-image features 130 extracted from the driving views 110, the rendered avatar 154 produced by this approach can include highly realistic surface detail such as wrinkles in the clothing of the user, and can provide improved rendering even of occluded areas of the user in the driving views, which are apparent when viewed from an arbitrary perspective.

Regarding training, the avatar generation program 16 is trained end-to-end by optimizing neural networks $F_I$, $F_P$, $F_T$, $F_N$, $F_R$ and $F_\Theta$, with respective loss functions. An adversarial loss may be used to train the textural renderer 152 ($F_R$) in the hybrid rendering module 149 of the avatar generation program 16, leveraging a multi-scale discriminator as an adversarial loss, and conditioning the multi-scale discriminator on both the generated image of the avatar 154 and the UV map-aligned pose-image features 130. For example, VGG loss 164 may be used in this context. Texture losses may be used to train the barycentric or bilinear interpolation function of the 3D volumetric representation module 139 and the image convolutional neural network 116 ($F_I$) of the UV-aligned feature extraction module 105 of the avatar generation program 16. For the image convolution neural network 116, the first three channels of the UV map-aligned image feature may be supervised for texture completion using the texture loss based on reference texture maps unwrapped from all reference views for a given pose. A texture loss may be used to train the texture encoder 136 ($F_T$). The shallow convolutional neural network $F_N$ used to predict surface normal from UV map-aligned features may be trained using supervised learning and L1 loss.

A normal loss may be used to train the pose convolutional neural ($F_P$) network 124 of the UV-aligned feature extraction module 105 of the avatar generation program 16, using a normal loss between the surface normals of meshes projected into UV space. A volume rendering loss 164 may be used to train the volumetric renderer 146 ($F_\Theta$) of the 3D volumetric representation module 139 of the avatar generation program 16, so that the training of volumetric renderer 146 is supervised at low resolution, applying training on the first three channels of the rasterized multi-channel volumetric features 148 in image space.

Figure 4:
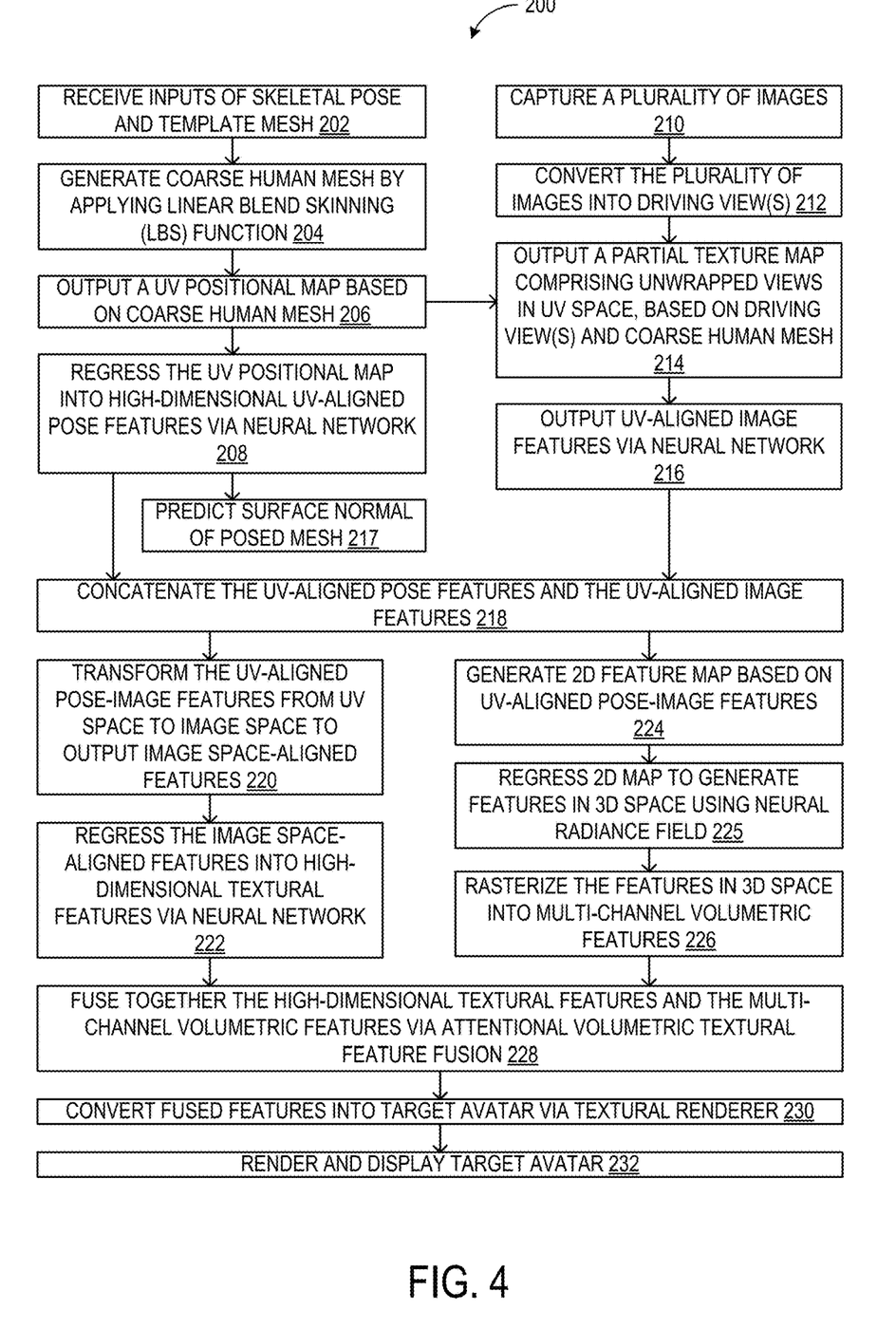
FIG. 4 is a flowchart of a method for generation of avatars according to an example embodiment of the present disclosure.

FIG. 4 illustrates a flowchart of a computerized method 200 for rendering a human avatar based on inputs including one or more driving views, a skeletal pose, and a template mesh. The following description of computerized method 200 is provided with reference to the software and hardware components described above and shown in FIGS. 1 to 3B. It will be appreciated that computerized method 200 also may be performed in other contexts using other suitable hardware and software components.

At step 202, inputs of a skeletal pose and a template mesh are received. At step 204, a coarse human mesh is generated by applying the LBS function using the skeletal pose and the template mesh as inputs. The coarse human mesh represents the user based on the template mesh and the skeletal pose of the user. At step 206, a UV positional map is generated and outputted based on the coarse human mesh. At step 208, the UV positional map is regressed into high-dimensional UV map-aligned pose features via a neural network. At step 217, for each of a plurality of elements in the posed mesh, a surface normal of the posed mesh is predicted.

At step 210, a plurality of images are captured. At step 212, one or more driving views are obtained by converting the plurality of images into at least a driving view. At step 214, a partial texture map is constructed and outputted comprising unwrapped views of the driving views in UV space, based on the one or more driving views and the coarse human mesh outputted at step 206. At step 216, UV map-aligned image features are extracted or generated from the partial texture map and outputted via a neural network. The UV map-aligned image features are aligned to the UV positional map.

At step 218, the UV map-aligned pose features and the UV map-aligned image features are concatenated into UV map-aligned pose-image features. At step 220, the UV map-aligned pose-image features are transformed from UV space to image space to extract or generate and output image space-aligned pose-image features. At step 222, the image space-aligned pose-image features are regressed into high-dimensional textural features via a neural network.

At step 224, a 2D feature map is generated based on the UV map-aligned pose-image features. At step 225, the 2D feature map is regressed using a neural radiance field to generate features in 3D space. At step 226, the features in 3D space are rasterized into multi-channel volumetric features.

At step 228, the high-dimensional textural features and the multi-channel volumetric features are fused together via attentional volumetric textural feature fusion. At step 230, the fused features are converted into a target avatar via a textural renderer 230. At step 232, the target avatar is rendered and displayed on the display.

Figure 5:
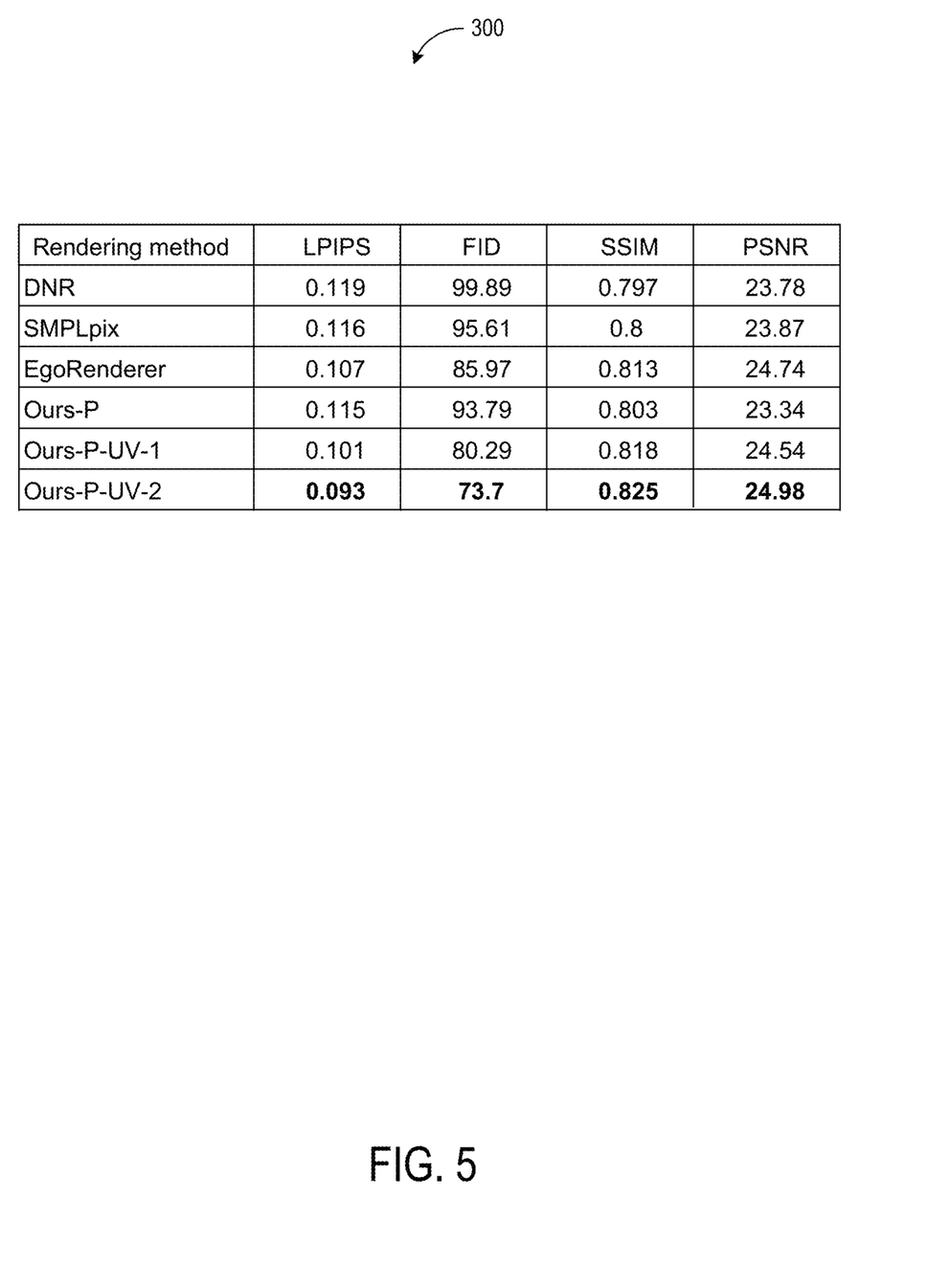
FIG. 5 is a table showing the differences in the performances between conventional rendering methods and an example implementation of the rendering systems and methods of the present disclosure.

FIG. 5 shows a table 300 illustrating the differences in the performances between conventional rendering methods and the rendering method of FIG. 4. The performances of the rendering methods were evaluated by four metrics: Learned Perceptual Image Patch Similarity (LPIPS), Frechet Inception Distance (FID), structural similarity index measure (SSIM), and peak signal-to-noise ratio (PSNR). The LPIPS metric evaluates the distance between image patches, where a higher metric corresponds to larger differences between the image patches, and a lower metric corresponds to more similarities between the image patches. FID is a metric for evaluating the quality of generated images and specifically developed to evaluate the performance of generative adversarial networks. SSIM is a method for measuring the similarity between two images. PSNR is an engineering term for the ratio between the maximum possible power of a signal and the power of corrupting noise that affects the fidelity of its representation.

The conventional rendering methods which were evaluated were Deferred Neural Rendering (DNR), the SMPLpix neural rendering framework, and EgoRenderer. The rendering methods of the present disclosure which were evaluated were the rendering method using one driving view (identified as 'Ours-P-UV-1') and the rendered method using two driving views (identified as 'Ours-P-UV-2'). A rendering method of the present disclosure which was modified to not use any driving view (identified as 'Ours-P') was also evaluated in this ablation study. As show in this table 300, the rendering method of the present disclosure using two driving views achieved the highest rendering performance of all the rendering methods evaluated by the present inventors.

Figure 6:
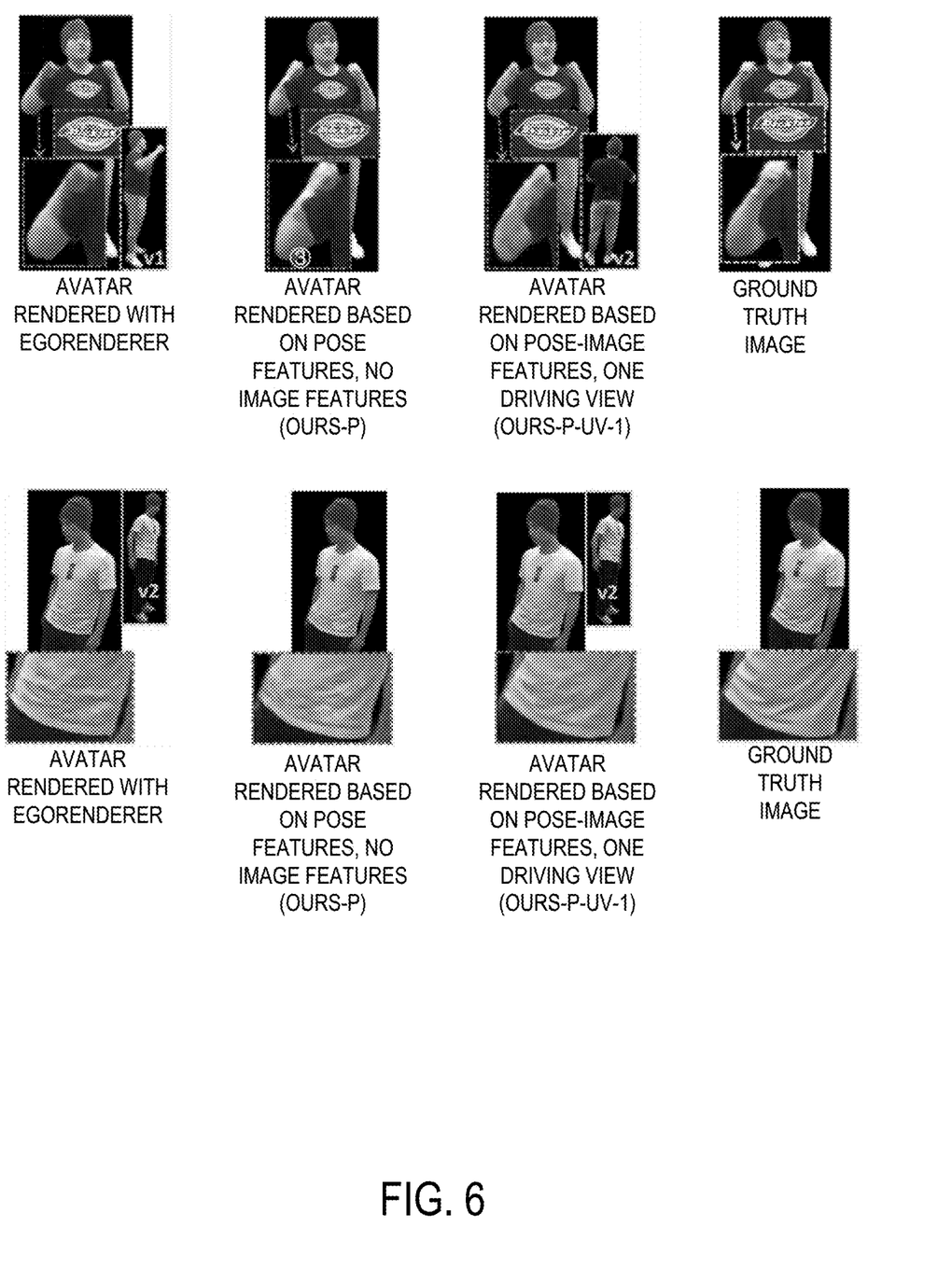
FIG. 6 illustrates the differences between avatars rendered using conventional rendering methods and avatars rendered using an example implementation of the rendering systems and methods of the present disclosure.

FIG. 6 illustrates the differences between the avatars rendered using the rendering method of the present disclosure using one driving view, avatars rendered using the rendering method of the present disclosure modified to not use any driving view, and avatars rendered using a conventional rendering method (EgoRenderer). The rendered avatars were compared to the ground truth images of the actual users corresponding to the rendered avatars. As shown in the first row of images, the avatar rendered using the rendering method of the present disclosure using one driving views shows the highest fidelity and resemblance to the ground truth image with minimal occlusions. As shown in the second row of images, the avatar rendered using the rendering method of the present disclosure using one driving views shows the highest fidelity and resemblance to the ground truth image including the detailed wrinkles on the user's shirt, thereby providing evidence of the technical efficacy of the systems and methods described herein.

The above-described system and methods use an effective scheme to encode UV map-aligned pose-image features, and leverages these to learn a pose- and image-conditioned downsampled NeRF (PID-NeRF) from low resolution images, so that high quality outputs can be produced at a small computational cost. UV map-aligned pose-image encoding is used as the basis for constructing PID-NeRF and extracting 2D textural features to achieve efficient, high quality, geometry-aware neural rendering of human avatars. The UV map-aligned encoder may accept arbitrary driving views as input, which may be leveraged for faithful rendering, and a texture loss may enforce full texture completion. Such faithful rendering may be used for improving rendering quality in telepresence applications, for example, so that outside-in motion capture systems are not necessary to faithfully render the human avatars corresponding to each participant in an augmented or virtual reality session. Numerous other applications are contemplated, including using a personal smartphone to capture the driving views with one camera, and generate avatars on the smartphone using the techniques described herein. Further, a plurality of smartphones could be used in a camera array to provide multiple driving views.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
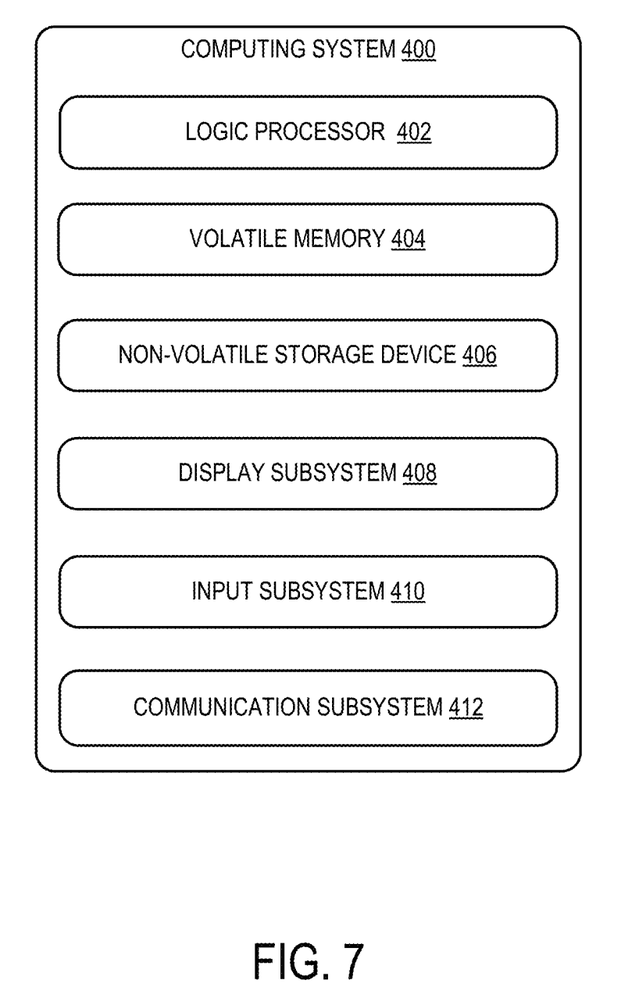
FIG. 7 shows an example computing environment of the present disclosure.

FIG. 7 schematically shows a non-limiting embodiment of a computing system 400 that can enact one or more of the methods and processes described above. Computing system 400 is shown in simplified form. Computing system 400 may embody the computing device 12 and the server computing device 32 described above and illustrated in FIGS. 1-3B, respectively. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display sub system 408, input sub system 410, communication sub system 412, and/or other components not shown in FIG. 7.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a computing system, comprising a processor and memory of a computing device, the processor being configured to execute an avatar generation program using portions of memory to obtain one or more driving views; calculate a skeletal pose of a user; generate a coarse human mesh representing the user based on a template mesh and the skeletal pose of the user; construct a UV positional map based on the coarse human mesh; construct a texture map based on the one or more driving views and the coarse human mesh; extract a plurality of image features from the texture map, the image features being aligned to the UV positional map; extract a plurality of pose features from the UV positional map, the pose features being aligned to the UV positional map; generate a plurality of pose-image features based on the UV map-aligned image features and UV map-aligned pose features; and render an avatar based on the plurality of pose-image features. In this aspect, additionally or alternatively, the one or more driving views are transformed into a partial texture map comprising a plurality of unwrapped texture maps in UV space; and the plurality of unwrapped texture maps are unioned and averaged to construct the texture map based on the one or more driving views and the coarse human mesh. In this aspect, additionally or alternatively, the plurality of pose features are extracted from the UV positional map via a pose convolutional neural network which regresses the UV positional map into the pose features aligned to the UV positional map; and the plurality of image features are extracted from the texture map via an image convolutional neural network which regresses the texture map into the image features aligned to the UV positional map. In this aspect, additionally or alternatively, each of the one or more driving views is a pixel image with color channels and no depth channels. In this aspect, additionally or alternatively, the UV positional map is constructed by projecting each surface point on the coarse human mesh from 3D space to a UV surface manifold; and each pixel on the UV positional map describes a relative location of a point on the UV surface manifold. In this aspect, additionally or alternatively, the coarse human mesh is generated using a Linear Blend Skinning (LBS) function on the template mesh of the user and the skeletal pose of the user. In this aspect, additionally or alternatively, the plurality of pose-image features are generated via a neural texture model which receives input of the UV map-aligned image features and the UV map-aligned pose features and outputs concatenated pose-image feature vectors. In this aspect, additionally or alternatively, the pose-image features include texture information indicating where wrinkles form in clothing of the user. In this aspect, additionally or alternatively, the processor is further configured to generate textural features and multi-channel volumetric features from the pose-image features, channels of the multi-channel volumetric features corresponding to color channels of one or a plurality of pixel images of the one or more driving views; and fuse the textural features and the multi-channel volumetric features to render the avatar. In this aspect, additionally or alternatively, the processor is further configured to obtain a target surface normal of the coarse human mesh and project the target surface normal into UV space, wherein the surface normal of the coarse human mesh is supervised with an L1 loss.

Another aspect provides a computerized method, comprising obtaining one or more driving views; calculating a skeletal pose of a user; generating a coarse human mesh representing the user based on a template mesh and the skeletal pose of the user; constructing a UV positional map based on the coarse human mesh; constructing a texture map based on the one or more driving views and the coarse human mesh; extracting a plurality of image features from the texture map, the image features being aligned to the UV positional map; extracting a plurality of pose features from the UV positional map, the pose features being aligned to the UV positional map; generating a plurality of pose-image features based on the UV map-aligned image features and the UV map-aligned pose features; and rendering an avatar based on the plurality of pose-image features. In this aspect, additionally or alternatively, the one or more driving views are transformed into a partial texture map comprising a plurality of unwrapped texture maps in UV space; and the plurality of unwrapped texture maps are unioned and averaged to construct the texture map based on the one or more driving views and the coarse human mesh. In this aspect, additionally or alternatively, the plurality of pose features are extracted from the UV positional map via a pose convolutional neural network which regresses the UV positional map into the pose features aligned to the UV positional map; and the plurality of image features are extracted from the texture map via an image convolutional neural network which regresses the texture map into the image features aligned to the UV positional map. In this aspect, additionally or alternatively, the one or more driving views is one or a plurality of pixel images with color channels and no depth channels. In this aspect, additionally or alternatively, the UV positional map is constructed by projecting each surface point on the coarse human mesh from 3D space to a UV surface manifold; and each pixel on the UV positional map describes a relative location of a point on the UV surface manifold. In this aspect, additionally or alternatively, the coarse human mesh is generated using a Linear Blend Skinning (LBS) function on the template mesh of the user and the skeletal pose of the user. In this aspect, additionally or alternatively, the plurality of pose-image features are generated via a neural texture model which receives input the UV map-aligned image features and the UV map-aligned pose features and outputs concatenated pose-image feature vectors. In this aspect, additionally or alternatively, the pose-image features include texture information indicating where wrinkles form in clothing of the user. In this aspect, additionally or alternatively, the method further comprises generating textural features and multi-channel volumetric features from the pose-image features, channels of the multi-channel volumetric features corresponding to color channels of one or a plurality of pixel images of the one or more driving views; and fusing the textural features and the multi-channel volumetric features to render the avatar and a mask corresponding to the avatar.

Another aspect provides a computing system, comprising a camera, a processor, and memory of a computing device, the processor being configured to execute an avatar generation program using portions of memory to obtain one or more driving views of a user via the camera, the one or more driving views being one or a plurality of pixel images with color channels and no depth channels; calculate a skeletal pose of the user based on the one or more driving views; receive a selection of a template mesh for the user; generate a coarse human mesh representing the user based on the template mesh and the skeletal pose of the user; construct a UV positional map based on the coarse human mesh; construct a texture map based on the one or more driving views and the coarse human mesh; extract a plurality of image features from the texture map, the image features being aligned to the UV positional map and including wrinkles in clothing of the user; extract a plurality of pose features from the UV positional map, the pose features being aligned to the UV positional map; generate a plurality of pose-image features based on the UV map-aligned image features and UV map-aligned pose features; generate textural features and multi-channel volumetric features from the pose-image features, channels of the multi-channel volumetric features corresponding to color channels of the one or the plurality of pixel images of the one or more driving views; fuse the textural features and the multi-channel volumetric features together; and render an avatar based on the fused textural features and the multi-channel volumetric features, the avatar including the wrinkles in the clothing of the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|---|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
   a processor and memory of a computing device, the processor being configured to execute an avatar generation program using portions of memory to:
      obtain one or more driving views;
      calculate a skeletal pose of a user;
      generate a coarse human mesh representing the user based on a template mesh and the skeletal pose of the user;
      construct a UV positional map based on the coarse human mesh;
      construct a texture map based on the one or more driving views and the coarse human mesh;
      extract a plurality of image features from the texture map, the image features being aligned to the UV positional map;
      extract a plurality of pose features from the UV positional map, the pose features being aligned to the UV positional map;
      generate a plurality of pose-image features based on the UV map-aligned image features and UV map-aligned pose features; and
      render an avatar based on the plurality of pose-image features.

2. The computing system of claim 1, wherein
   the one or more driving views are transformed into a partial texture map comprising a plurality of unwrapped texture maps in UV space; and
   the plurality of unwrapped texture maps are unioned and averaged to construct the texture map based on the one or more driving views and the coarse human mesh.

3. The computing system of claim 1, wherein
   the plurality of pose features are extracted from the UV positional map via a pose convolutional neural network which regresses the UV positional map into the pose features aligned to the UV positional map; and
   the plurality of image features are extracted from the texture map via an image convolutional neural network which regresses the texture map into the image features aligned to the UV positional map.

4. The computing system of claim 1, wherein each of the one or more driving views is a pixel image with color channels and no depth channels.

5. The computing system of claim 1, wherein
the UV positional map is constructed by projecting each surface point on the coarse human mesh from 3D space to a UV surface manifold; and
each pixel on the UV positional map describes a relative location of a point on the UV surface manifold.

6. The computing system of claim 1, wherein the coarse human mesh is generated using a Linear Blend Skinning (LBS) function on the template mesh of the user and the skeletal pose of the user.

7. The computing system of claim 1, wherein the plurality of pose-image features are generated via a neural texture model which receives input of the UV map-aligned image features and the UV map-aligned pose features and outputs concatenated pose-image feature vectors.

8. The computing system of claim 7, wherein the pose-image features include texture information indicating where wrinkles form in clothing of the user.

9. The computing system of claim 1, wherein the processor is further configured to:
generate textural features and multi-channel volumetric features from the pose-image features, channels of the multi-channel volumetric features corresponding to color channels of one or a plurality of pixel images of the one or more driving views; and
fuse the textural features and the multi-channel volumetric features to render the avatar.

10. The computing system of claim 1, wherein the processor is further configured to:
obtain a target surface normal of the coarse human mesh and project the target surface normal into UV space, wherein
the surface normal of the coarse human mesh is supervised with an L1 loss.

11. A computerized method, comprising:
obtaining one or more driving views;
calculating a skeletal pose of a user;
generating a coarse human mesh representing the user based on a template mesh and the skeletal pose of the user;
constructing a UV positional map based on the coarse human mesh;
constructing a texture map based on the one or more driving views and the coarse human mesh;
extracting a plurality of image features from the texture map, the image features being aligned to the UV positional map;
extracting a plurality of pose features from the UV positional map, the pose features being aligned to the UV positional map;
generating a plurality of pose-image features based on the UV map-aligned image features and the UV map-aligned pose features; and
rendering an avatar based on the plurality of pose-image features.

12. The method of claim 11, wherein
the one or more driving views are transformed into a partial texture map comprising a plurality of unwrapped texture maps in UV space; and
the plurality of unwrapped texture maps are unioned and averaged to construct the texture map based on the one or more driving views and the coarse human mesh.

13. The method of claim 11, wherein
the plurality of pose features are extracted from the UV positional map via a pose convolutional neural network which regresses the UV positional map into the pose features aligned to the UV positional map; and
the plurality of image features are extracted from the texture map via an image convolutional neural network which regresses the texture map into the image features aligned to the UV positional map.

14. The method of claim 11, wherein the one or more driving views is one or a plurality of pixel images with color channels and no depth channels.

15. The method of claim 11, wherein
the UV positional map is constructed by projecting each surface point on the coarse human mesh from 3D space to a UV surface manifold; and
each pixel on the UV positional map describes a relative location of a point on the UV surface manifold.

16. The method of claim 11, wherein the coarse human mesh is generated using a Linear Blend Skinning (LBS) function on the template mesh of the user and the skeletal pose of the user.

17. The method of claim 11, wherein the plurality of pose-image features are generated via a neural texture model which receives input the UV map-aligned image features and the UV map-aligned pose features and outputs concatenated pose-image feature vectors.

18. The method of claim 17, wherein the pose-image features include texture information indicating where wrinkles form in clothing of the user.

19. The method of claim 11, further comprising:
generating textural features and multi-channel volumetric features from the pose-image features, channels of the multi-channel volumetric features corresponding to color channels of one or a plurality of pixel images of the one or more driving views; and
fusing the textural features and the multi-channel volumetric features to render the avatar and a mask corresponding to the avatar.

20. A computing system, comprising:
a camera, a processor, and memory of a computing device, the processor being configured to execute an avatar generation program using portions of memory to:
obtain one or more driving views of a user via the camera, the one or more driving views being one or a plurality of pixel images with color channels and no depth channels;
calculate a skeletal pose of the user based on the one or more driving views;
receive a selection of a template mesh for the user;
generate a coarse human mesh representing the user based on the template mesh and the skeletal pose of the user;
construct a UV positional map based on the coarse human mesh;
construct a texture map based on the one or more driving views and the coarse human mesh;
extract a plurality of image features from the texture map, the image features being aligned to the UV positional map and including wrinkles in clothing of the user;
extract a plurality of pose features from the UV positional map, the pose features being aligned to the UV positional map;
generate a plurality of pose-image features based on the UV map-aligned image features and UV map-aligned pose features;

generate textural features and multi-channel volumetric features from the pose-image features, channels of the multi-channel volumetric features corresponding to color channels of the one or the plurality of pixel images of the one or more driving views;
fuse the textural features and the multi-channel volumetric features together; and
render an avatar based on the fused textural features and the multi-channel volumetric features, the avatar including the wrinkles in the clothing of the user.

* * * * *